Patented Oct. 14, 1952

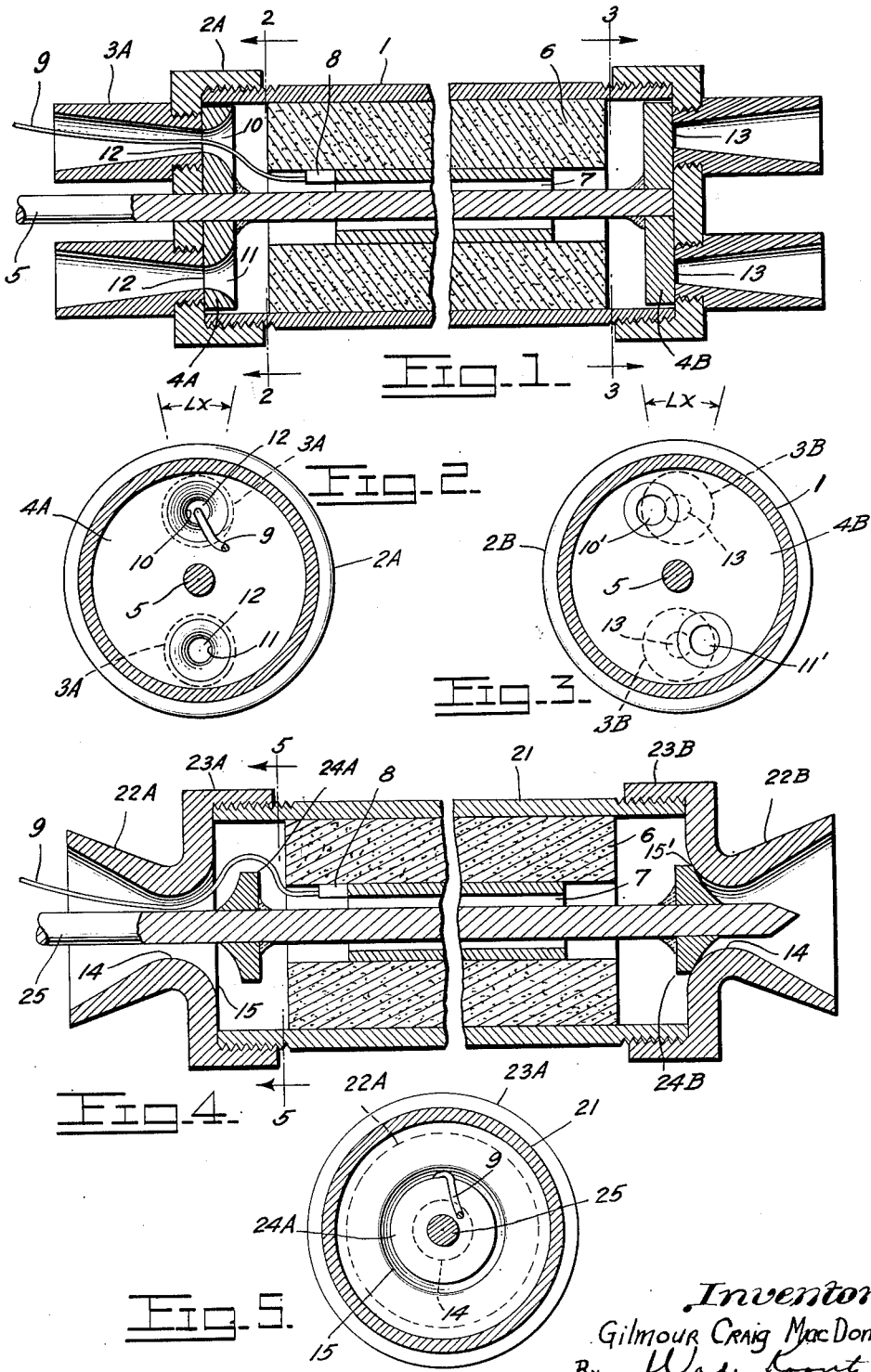

2,613,497

UNITED STATES PATENT OFFICE 2,613,497

CONTROLLABLE ROCKET THRUST DEVICE

Gilmour Craig MacDonald, Ames, Iowa

Application April 1, 1947, Serial No. 738,602

9 Claims. (Cl. 60—35.6)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to rocket thrust devices and more particularly to means for providing selective and controllable operation whereby the direction, duration, and magnitude of the thrust may be varied.

Jet assisted take-off, or "JATO," is a well known development of the Armed Forces and the use of rockets for various purposes, such as acceleration and deceleration of aircraft or land vehicles, is not new in the art.

It is an object of my invention, however, to provide means whereby the pilot of an airplane, for example, may have the choice of any degree of acceleration or deceleration within the capabilities of the thrust unit without employing duplicate rocket thrust units pointed oppositely or using means for mechanically "pointing" the rocket or nozzle in the desired direction. Hazards incident to aircraft operation may be very much reduced by employment of a device of the character hereinafter described in that engine failure at a critical instant (or the absence of a power plant, as in the case of motorless aircraft) does not deprive the pilot of a burst of power which may be needed to clear an obstacle or to reach a safe landing area, with the added advantage that should the situation require, the pilot may obtain a decelerating thrust that will permit a steep approach to the landing area and/or shorten the landing roll of the aircraft.

It is a further object of this invention to provide means for terminating the thrust of a rocket thrust unit at any desired time. Normal JATO practice employs multiple rocket units for take-off, and failure of one of the rocket units to ignite can well cause the aircraft to turn off the runway and crash, or to fail to attain flying speed at the end of the runway. Present practice in solid fuel thrust units does not permit termination of thrust before the propellant is entirely consumed.

An additional object of this invention is to provide auxiliary means for controlling the direction of motion of a vehicle employing rocket-type brakes. A transversely mounted rocket thrust unit wherein dual parallel nozzles are inclined so as to exhaust forward and upward at an angle of, say, 45 degrees, from opposite sides of the vehicle, may be employed to prevent the vehicle from skidding out of control. This may be accomplished by linking the means controlling the relative gas flow to the nozzles with the steering gear. Such a braking unit would combine emergency deceleration of the vehicle with means permitting a degree of directional control even when stopping on icy surfaces.

Other objects and advantages of this invention will be apparent during the course of the following description, reference being made to the attached drawing wherein:

Figure 1 is a longitudinal section view of a portion of a controllable rocket thrust unit employing ported plates as valving means to control the direction and magnitude of thrust.

Figure 2 is a cross section view taken on line 2—2 of Figure 1.

Figure 3 is a cross section view taken on line 3—3 of Figure 1.

Figure 4 is a similar view of a system employing sliding plugs to control the relative gas flow through each end nozzle and hence the net thrust resulting.

Figure 5 is a cross section view taken on line 5—5 of Figure 4.

Referring to the drawing for the purposes of illustration, Figure 1 depicts a longitudinal section view of a controllable rocket thrust unit comprising a combustion chamber cylinder or tube 1 containing a main charge of suitable powder comprising the propellant 6, a smaller charge of powder constituting the propellant igniter 7, and an igniter 8 for igniting the propellant igniter 7. The igniter 8 may be a conventional fuse positioned adjacent the charge 7 and connected by an electrical conductor 9 to a circuit switch (not shown) so that when the switch is in circuit-closing position, the fuse is heated and ignites the charge 7 which, in turn, ignites the propellant 6. The resultant combustion generates gas at high pressure within the combustion chamber. The combustion chamber tube 1 is screwed into end caps 2A and 2B which in turn carry a plurality of nozzles, 3A, 3B, the gas flow through which is controlled by valve plates 4A, 4B, solidly carried on control shaft 5 which is free to rotate with respect to end caps 2A, 2B. Valve plates 4A, 4B, are so ported and indexed with respect to their respective nozzles that the total effective gas discharge area remains substantially constant regardless of whether nozzles 3A are fully opened with opposing nozzles 3B closed, or whether both nozzles 3A and 3B are partially open. This is illustrated in Figures 2 and 3 wherein each of the valve plates, 4A, 4B, is provided with two ports for valving a similar number of nozzles at the corresponding end of the combustion chamber. The valve plates are substantially identical with respect to the size, shape, and relative spacing of their respective ports which are depicted as being circular orifices flared slightly in the direction of the combustion chamber and equally spaced about a common center from which they are also equidistant. The ports of the valve plate 4A are designated by the reference numerals 10 and 11, and the corresponding ports of the valve plate 4B are designated by the reference numerals 10' and 11'. Plates 4A and 4B are fixed on the control shaft 5 with the ports of each plate in predetermined "offset" or "out of phase" relationship with respect to the corresponding ports of the other plate so that each ported plate functions to complement the valving action of the other ported plate for continuously venting the combustion chamber over an area which is maintained at a substantially constant value in all positions of the control shaft and the valve plates. In the construction illustrated, the rotation of the shaft 5 is limited to the angle $x$ and, in Figure 2, the shaft 5 is shown as rotated to the position in which the ports 10 and 11 are centered over the inlet openings 12 of the nozzles 3A, and fully expose the same to provide separate vents or gas exits. The total vent area, effective for gas discharge through nozzle 3A, is equal to the sum of the areas of the respective openings 12. When the shaft 5 is in the position shown in Figure 2, the instant position of the valve plate 4B is as shown in Figure 3 from which it is apparent that the ports 10' and 11' are displaced relatively to the inlet openings 13 of the nozzles 3B so that the openings 13 are covered and fully closed by non-ported portions of the plate 4B. The "offset" or "out of phase" relationship of the ports of the respective valve plates is such that when the ports 10 and 11 of the valve plate 4A are so moved with respect to the nozzle openings 12 that the openings 12 are either fully or partially closed, the ports 10' and 11' of the valve plate 4B are simultaneously moved with respect to the nozzle openings 13 to uncover and expose the openings 13 to the same extent that the openings 12 are closed. Hence, the ported valve plates 4A and 4B having an alternation of valving action which permits the partial covering or uncovering of both pairs of nozzle openings 12 and 13 at the same time but not a complete uncovering or a complete closing of both pairs of openings simultaneously. It will be seen that evolution of gases within the rocket will produce a jet reaction force which may be varied from zero to a maximum in either direction as desired by rotating control shaft 5.

Figures 4 and 5 illustrate another means of obtaining controllable operation wherein the combustion chamber tube 21 is screwed into end caps 23A and 23B which carry nozzles 22A and 22B respectively. Combustion of the propellant 6 after ignition thereof through the action of igniters 7 and 8 evolves gas which may be allowed to flow through either or both of the nozzles 22A and 22B, the flow being controlled by plugs 24A, 24B attached to axially slidable control shaft 25. Plug and nozzle configurations and spacings are designed so that the total effective nozzle area available for gas exit is substantially constant regardless of the position of the control shaft 25 and plugs 24A, 24B. In the design illustrated, the plugs are identical and each is substantially conical in configuration to seat snugly against a conical segment of the nozzle passageway lying between the nozzle throat 14 and the nozzle inlet opening. For convenience of identification in description, the nozzle inlet opening of the nozzle 22A is designated by the reference numeral 15 and the nozzle inlet opening of the nozzle 22B is designated by the reference numeral 15'. As shown more particularly in Figure 4, the conical plugs 24A and 24B are fixed on the slide shaft 25 at such spaced apart locations that when the plug 24B is seated over the opening 15' to completely close the opening, the plug 24A is unseated from the opening 15 so that the total effective area of the opening is available for gas exit from the combustion chamber; the distance between the conical sides of the unseated plug 24A and the nozzle opening 15 being such that movement of the slide shaft 25 in a direction unseating the plug 24B causes the plug 24A to approach its seat so that the conical sides of the plug enter the nozzle opening 15 and reduces its effective vent area to the same extent that the effective vent area of opening 15' is increased by the unseating of the plug 24B. Each valve plug thus functions to complement the valving action of the other plug for maintaining the vent area available for gas discharge at a substantially constant value in all positions of the slide shaft and valve plugs.

The number of nozzles employed for venting the rocket combustion chamber may vary in any given construction or design of rocket and the number, size, and relative offsetting of the valve members will likewise vary in accordance with the number of nozzles employed and the nature and magnitude of the movement of the control shaft.

Obviously many other means for obtaining selective two-way operation may be employed without departing from the spirit of this invention. It will be understood that the scope of this invention is not limited to the exemplary structure illustrated and specifically described, but is limited only by the scope of the following claims.

I claim:

1. A rocket thrust device comprising in combination, a combustible gas-generating propellant, a combustion chamber for confining the said propellant and having two outlet nozzles for discharging the generated gas at a high pressure to produce thrust, one of the outlet nozzles being secured to one end of the said combustion chamber, the other outlet nozzle being secured to the opposite end of the said chamber with its outlet directed in an opposite direction than the outlet of said first mentioned nozzle, separate closure means for each of said nozzles, and means for moving said closure means to open either or both of the said outlet nozzles for controlling the direction and/or duration of the thrust produced by the combustion of said propellant.

2. A rocket thrust device comprising in combination, a combustible gas-generating propellant, a combustion chamber confining the propellant and having two nozzles giving a choice of direction of thrust, means for igniting the propellant, separate valve means for each nozzle, and means for operating the said valve means to open either or both of the nozzles as desired for controlling the direction, magnitude, and duration of the thrust.

3. In a rocket thrust device having a combustion chamber containing a solid combustible gas-generative propellant and having oppositely directed nozzle vents, the combination of a control member extending into the chamber and separate valve members within the chamber and secured on the control member in valving relation to the nozzle vents so that each valve member controls one of the vents, said valve members being movable by said control member for simultaneous adjustment with respect to the nozzle vents for opening and closing the latter and being differently phased so that the effective vent area of the thrust device is substantially constant in all positions of the control and valve members.

4. In a rocket thrust device, a propellant chamber comprising a tube, propellant material within the tube and adapted to be ignited for generating a gas at high pressure a screw cap on each end of the tube and having a nozzle forming a gas-discharge outlet for the tube; a movable valve shaft extending into the tube, a nozzle valve at one end of the tube and mounted on the shaft to be moved thereby for opening and closing the nozzle of the adjacent end cap, and a nozzle valve at the other end of the tube and mounted on the shaft to be moved thereby for closing and opening the nozzle of the end cap at such other end, said nozzle valves being operatively positioned on said shaft in predetermined relation to adjacent nozzles so that the valving action of each nozzle valve complements the valving action of the other nozzle valve whereby the total effective outlet area available for gas discharge is substantially constant at all times regardless of the position to which the shaft and nozzle valve are moved.

5. A rocket thrust device comprising in combination, a propellant of solid combustible material adapted to be ignited for generating a gas at high pressure, a combustion chamber confining the propellant, means for discharging the generated gas from the combustion chamber at a pressure producing a thrust and including an outlet nozzle secured to the combustion chamber, and means for controlling the thrust through variation thereof to complete neutralization including a venting nozzle also secured to the said combustion chamber and oppositely directed relatively to the said outlet nozzle and a valve operatively associated with the venting nozzle and mechanism operatively associated with the valve and operable for moving the valve from fully closed position to fully or partially open position.

6. A rocket thrust device comprising in combination, a combustible gas-generating propellant, a combustion chamber confining the propellant and having two vent nozzles giving a choice of direction of thrust, means for igniting the propellant, and means for controlling the gas flow through the said vent nozzles including a separate valve member associated with each nozzle for controlling the gas flow through the vent and valve-control means common to and operatively connected with the valve member for simultaneously and variously positioning the valve members in flow control relation with respect to their respective vent nozzles so that the total effective vent area for the discharge of gas from the combustion chamber is constant in all positions of the valve members and regardless of whether one is fully open with the other nozzle vent fully closed or whether all vents are partially open.

7. A rocket thrust device comprising in combination, a combustible gas-generating propellant, a cylindrical combustion chamber confining the propellant and having a plurality of nozzles at each end, means for igniting the propellant, a rotatable valve disk at each end of the chamber and having individual ports for the adjacent nozzles, and a rotatable control shaft extending into the chamber and secured to the valve disks for simultaneously rotating the latter, the ports of one disk being offset relative to the ports of the other disk whereby each disk functions to complement the valving action of the other disks to permit all nozzles to be partially opened at the same time but to maintain the nozzles at one end fully closed when the nozzles at the other end are fully open.

8. A rocket thrust device comprising in combination, a combustible gas-generating propellant, a combustion chamber confining the propellant and having two nozzle vents disposed to give a choice of direction of thrust, means for igniting the propellant, a rotatable and ported valve member operatively associated with each nozzle vent for opening and closing the vent, and a rotatable control shaft interconnecting the valve members for simultaneously rotating the members and varying the valving action of the members between the extremes of fully open and fully closed valve positions, said valve members being so ported and indexed with respect to their respective nozzles that the valving action of each member complements the valving action of the other member so that the total effective vent area available for gas exit is substantially constant in all positions of the control shaft and valve members.

9. A rocket thrust device comprising in combination, a combustible gas-generating propellant, a cylindrical combustion chamber confining the propellant and having a gas-outlet nozzle at each end, means for igniting the propellant, a valve plug at each end of the chamber for opening and closing the adjacent gas-outlet nozzle, each plug being slidably movable from and to a position in which it fully closes the adjacent nozzle to and from a position in which the said nozzle is fully open, and means for moving the valve plugs including a slidable rod extending into the combustion chamber and having the plugs connected thereto for simultaneous sliding movement therewith, said plugs being spaced apart on the said shaft in predetermined relation to adjacent nozzles so that the valving action of each valve plug complements the valving action of the other valve plug whereby the total effective outlet area available for gas exit is maintained substantially constant at all times and in all positions of the slide rod and valve plugs.

GILMOUR CRAIG MACDONALD.

REFERENCES CITED

The following references are of record in the file of this patent:

UNITED STATES PATENTS

| Number | Name | Date |
|---|---|---|
| 114,914 | Burke | May 16, 1871 |
| 118,363 | Harding | Aug. 22, 1871 |
| 253,215 | Maynard | Feb. 7, 1882 |
| 730,042 | Okun | June 2, 1903 |
| 1,259,753 | Lassell | Mar. 19, 1918 |
| 1,714,917 | Martin | May 28, 1929 |

FOREIGN PATENTS

| Number | Country | Date |
|---|---|---|
| 183,434 | Great Britain | June 7, 1923 |
| 330,493 | Great Britain | June 12, 1930 |
| 864,822 | France | Feb. 3, 1941 |
| 95,141 | Switzerland | June 1, 1922 |